(12) United States Patent
Gutierrez et al.

(10) Patent No.: US 7,813,634 B2
(45) Date of Patent: Oct. 12, 2010

(54) AUTOFOCUS CAMERA

(75) Inventors: Roman C. Gutierrez, Arcadia, CA (US); Robert J. Calvet, Pasadena, CA (US); Darrell Harrington, Pasadena, CA (US); Guiqin Wang, Arcadia, CA (US); Kumaraswamy Jayaraj, San Diego, CA (US)

(73) Assignee: Tessera MEMS Technologies, Inc., Arcadia, CA (US)

( * ) Notice: Subject to any disclaimer, the term of this patent is extended or adjusted under 35 U.S.C. 154(b) by 601 days.

(21) Appl. No.: 11/361,608

(22) Filed: Feb. 24, 2006

(65) Prior Publication Data

US 2006/0204242 A1   Sep. 14, 2006

Related U.S. Application Data

(63) Continuation-in-part of application No. 11/268,849, filed on Nov. 8, 2005, now Pat. No. 7,646,969, and a continuation-in-part of application No. 11/269,304, filed on Nov. 8, 2005, now Pat. No. 7,555,210.

(60) Provisional application No. 60/657,261, filed on Feb. 28, 2005.

(51) Int. Cl.
*G03B 3/10* (2006.01)

(52) U.S. Cl. .................. 396/133; 396/439; 396/452

(58) Field of Classification Search ................ 396/133, 396/439, 452; 359/391–396
See application file for complete search history.

(56) References Cited

U.S. PATENT DOCUMENTS

| 4,333,722 A * | 6/1982 | Lee ............................. 396/449 |
| 5,825,560 A * | 10/1998 | Ogura et al. ................ 359/822 |
| 6,392,703 B1 * | 5/2002 | Uchino et al. ............... 348/373 |
| 6,426,777 B1 | 7/2002 | Sato |
| 6,497,141 B1 * | 12/2002 | Turner et al. .................. 73/105 |
| 6,847,907 B1 * | 1/2005 | Novotny ...................... 702/84 |
| 6,850,675 B1 | 2/2005 | Calvet et al. |
| 6,914,635 B2 | 7/2005 | Ostergard |
| 2002/0006687 A1 | 1/2002 | Lam |
| 2002/0105699 A1 * | 8/2002 | Miracky et al. ............. 359/159 |
| 2003/0076421 A1 * | 4/2003 | Dutta .................... 348/208.11 |
| 2004/0183936 A1 * | 9/2004 | Kim et al. ................... 348/340 |
| 2004/0201773 A1 * | 10/2004 | Ostergard ................... 348/374 |
| 2005/0002008 A1 | 1/2005 | De Weerdt et al. |
| 2005/0002086 A1 * | 1/2005 | Starkweather et al. ...... 359/291 |
| 2005/0219399 A1 * | 10/2005 | Sato et al. .................. 348/340 |

(Continued)

OTHER PUBLICATIONS

Akihiro Koga et al.; "Electrostatic Linear Microactuator Mechanism for Focusing a CCD Camera"; Journal of Lightwave Technology, vol. 17, No. 1; p. 43-47; Jan. 1999.

*Primary Examiner*—W. B. Perkey
*Assistant Examiner*—Warren K Fenwick
(74) *Attorney, Agent, or Firm*—Haynes and Boone, LLP

(57) ABSTRACT

A method and system for facilitating focusing of a miniature camera are disclosed. One or more lenses can be attached to a MEMS stage. The MEMS stage can be moved by a Lorentz actuator. The MEMS stage can be configured to limit movement of the lens(es) to a single degree of freedom to inhibit misalignment thereof with respect to an imaging sensor. The stage can be biased to a predefined position thereof, e.g., for focus at infinity. A metal cover can inhibit electromagnetic interference and can limit movement of the lens(es).

11 Claims, 11 Drawing Sheets

U.S. PATENT DOCUMENTS

2005/0249487 A1* 11/2005 Gutierrez ................ 396/85
2006/0028320 A1* 2/2006 Osaka ................ 340/384.1
2006/0193618 A1* 8/2006 Calvet ................ 396/79

* cited by examiner

AUTOFOCUS CAMERA

PRIORITY CLAIM

This patent application claims the benefit of the priority date of U.S. provisional patent application Ser. No. 60/657,261, filed on Feb. 28, 2005 and entitled AUTOFOCUS CAMERA pursuant to 35 USC 119. The entire contents of this provisional patent application are hereby expressly incorporated by reference.

This patent application is a continuation-in-part (CIP) of U.S. patent application Ser. No. 11/268,849, filed on Nov. 8, 2005 now U.S. Pat. No. 7,646,969 and entitled CAMERA SNUBBER ASSEMBLY and U.S. patent application Ser. No. 11/269,304, filed on Nov. 8, 2005 now U.S. Pat. No. 7,555,210 and entitled AXIAL SNUBBERS FOR CAMERA. The entire contents of both of these patent applications are hereby expressly incorporated by reference.

TECHNICAL FIELD

The present invention relates generally to cameras. The present invention relates more particularly to a miniature autofocus camera that is suitable for use in personal electronic devices, such as cellular telephones.

BACKGROUND

Digital cameras are well known. As their cost drops, digital cameras continue to grow in popularity. Digital cameras eliminate the need to purchase film and have it developed. They also greatly reduce the need to have prints made, since digital images can easily be viewed on a computer monitor or the like. Digital cameras have thus reduced the overall cost of photography.

One rapidly growing application for digital cameras is their use in personal electronic devices, such as cellular telephones. Camera phones outsold other digital cameras for the first time in the last quarter of 2003. Camera phones allow pictures to be conveniently and rapidly shared with others. Images can be captured on the spur of the moment and then easily communicated to others via the cellular telephone network and/or via the Internet.

Although such contemporary camera phones have proven generally suitable for their intended purposes, they possess inherent deficiencies that detract from their overall effectiveness and desirability. For example, contemporary digital cameras commonly have variable focus. However, contemporary camera phones do not have this desirable feature. Contemporary variable focus mechanisms are simply too bulky for today's compact camera phones.

As such, contemporary camera phones have fixed focuses. Although a fixed focus can sometimes be adequate under good lighting conditions, a fixed focus generally does not perform well when the camera is used in low light conditions. A fixed focus mechanism approximates a pinhole lens to provide sufficient depth of field so as to remain in focus, at least to some degree, regardless of the distance between the subject and the camera. However, such a stopped-down lens is undesirably sensitive to ambient lighting conditions. This is because the near pinhole lens of a fixed focus camera does not admit much light. Thus, such fixed focus cameras generally require more light than variable focus cameras. In addition, the small aperture of a pinhole lens limits the resolution of the camera, due to the diffraction limit of light. Thus, such fixed focus cameras generally have lower resolution than variable focus cameras.

When there is insufficient ambient lighting, the image tends to appear undesirably dark. In recognizing the limitations of contemporary camera phones using such fixed focus lenses, the prior art has provided flash mechanisms in an attempt to insure that adequate light is provided. However, cellular telephones use battery power supplies, and thus have limited power available for the use of such flash mechanisms. More frequent use of the flash to take photographs thus results in the need to more frequently charge the camera phone. Of course, frequent recharging is undesirable.

As such, it is desirable to provide a miniature autofocus camera that is suitable for use in personal electronic devices, such as cellular telephones.

BRIEF SUMMARY

Systems and methods are disclosed herein to provide a miniature autofocus camera that is suitable for use in personal electronic devices, such as cellular telephones, pocket PCs, notebook computers, laptop computers, and tablet computers. In accordance with an embodiment of the present invention, a stage for a miniature camera is at least partially formed by a MEMS process. The stage can comprise a fixed portion, a movable portion, and flexures for controlling movement of the movable portion with respect to the fixed portion. Thus, for example, a lens can be attached to the movable portion of the MEMS stage and movement of the lens can be substantially limited to movement in one degree of freedom.

According to an embodiment of the present invention, a stage assembly can comprise a stage, at least one magnet of an actuator attached to the stage for effecting movement of the stage, and at least one lens attached to the stage such that movement of the lens effects focusing of the camera. A coil attached to a housing of the camera can cooperate with the magnet to effect such movement.

Thus, according to an embodiment of the present invention, a method for focusing a miniature camera can comprise effecting current flow through a coil such that a magnet moves in response to the current flow. A stage moves in response to movement of the magnet and a lens moves in response to movement of the stage.

According to an embodiment of the present invention, a method for assembling a miniature camera can comprise attaching a magnet assembly, a stage, and a lens mount together in a planar fashion. Such assembly facilitates the use of automated assembly equipment, such as pick and place equipment.

According to an embodiment of the present invention, a miniature camera can comprise a housing and a coil attached to the housing so as to be substantially fixed in position with respect thereto. The housing can be configured so as to align the coil with respect to a magnet attached to a stage. The housing can also be configured so as to align the stage with respect to an imaging sensor.

According to an embodiment of the present invention, a miniature camera can comprise an imaging sensor, a lens mount configured mount at least one lens, and a cover within which the lens mount is disposed. The cover and the lens mount can be configured so as to limit movement of the lens mount. For example, the cover can be configured so as to abut the lens mount when the lens mount moves to a limit of travel away from the imaging sensor.

The cover can be formed of metal and can be configured so as to mitigate electromagnetic interference with the camera. Thus, performance of the camera can be substantially enhanced.

According to an embodiment of the present invention, a miniature camera can comprise an imaging sensor, an optics assembly having at least one movable optical element wherein movement of the optical element(s) effect focusing of the camera, a MEMS stage to which the movable optical element(s) are attached such that the stage controls motion of the movable optical element(s), and an actuator for moving the stage.

According to an embodiment of the present invention, a miniature camera can comprise an imaging sensor, a housing, and a MEMS stage disposed within the housing wherein the MEMS stage is configured so as to move substantially only in one degree of freedom. A snubber assembly can be configured to further limit movement of the MEMS stage substantially in five degrees of freedom, so as to protect the stage from excessive movement. A lens holder can be attached to one surface, e.g., the upper surface, of the stage. At least one focusing lens can be attached to the lens holder.

An actuator can be disposed within the housing. The actuator can comprise a coil attached to the housing and a magnet attached to the stage. The housing can align the coil with respect to the magnet and can also align the stage with respect to the imaging sensor. A bias spring can be configured to bias the stage into a predefined position with respect to the housing. The metal cover can be configured to substantially enclose the actuator and the imaging sensor. The actuator can effect movement of the lens so as to provide desired focusing of an image upon the imaging sensor.

According to an embodiment of the present invention, a method for making a miniature camera can comprise providing a printed circuit board, attaching an imaging sensor to the printed circuit board, providing a MEMS stage that is configured to move substantially in only one degree of freedom, attaching a lens mount to the MEMS stage in a planar fashion, attaching a lens to the lens mount, attaching a magnet to the MEMS stage in a planar fashion, providing a housing, attaching a coil to the housing, placing the MEMS stage and a snubber assembly within the housing, wherein the snubber assembly is configured to limit movement of the MEMS stage substantially in five degrees of freedom, compressing a bias spring so as to bias the stage into a predefined position with respect to the housing and attaching a clip to the housing so as to hold the bias spring in place, and at least partially enclosing the actuator and the imaging sensor with a metal cover.

In view of the foregoing, a miniature autofocus camera is provided. The miniature autofocus camera is suitable for use in personal electronic devices, such as cellular telephones. The autofocus miniature camera can provide enhanced images in low light conditions. The need for a flash is mitigated, such that battery life is extended.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

Figure 1:
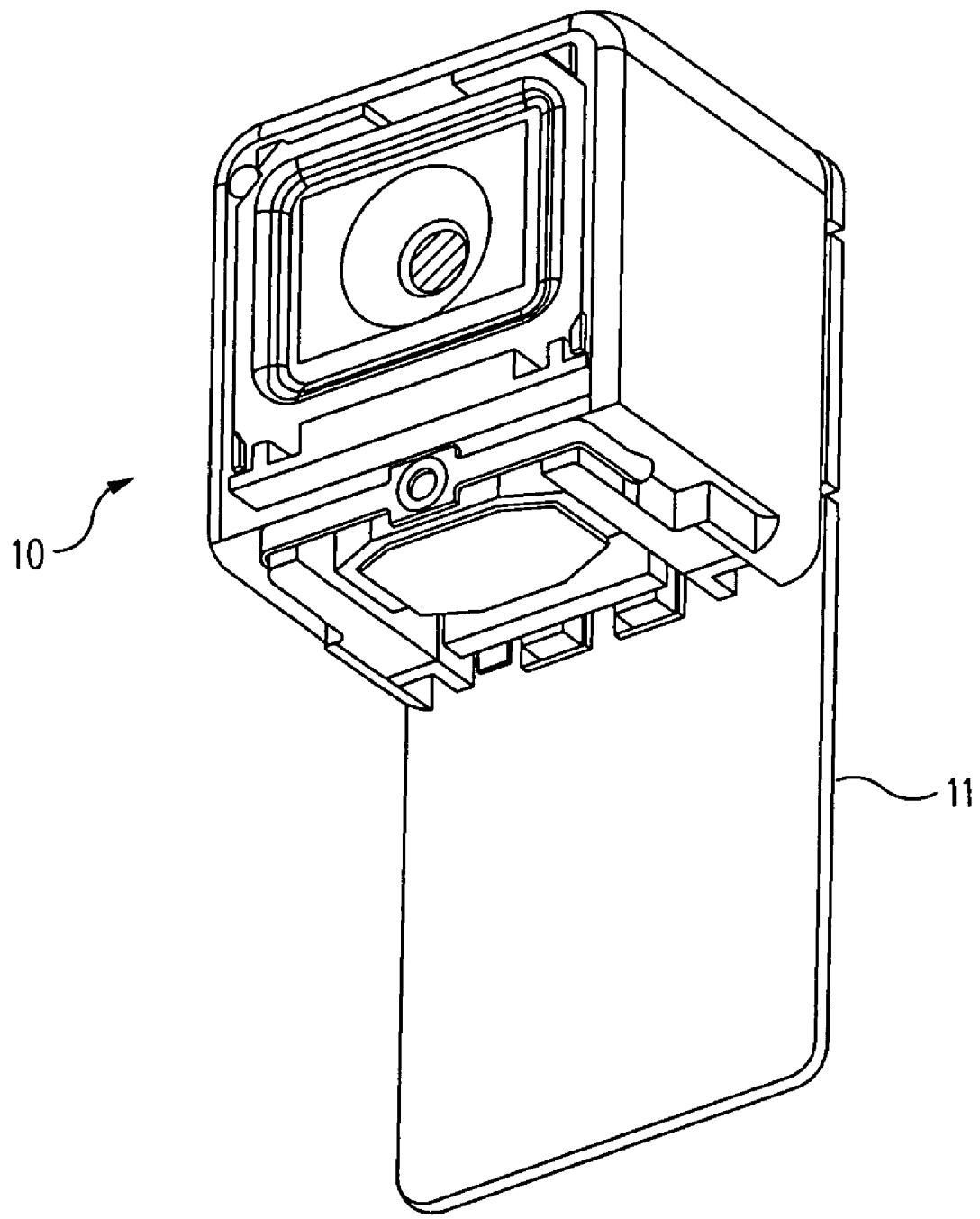
FIG. 1 is a perspective view of an autofocus camera according to an exemplary embodiment of the present invention, wherein the electromagnetic interference (EMI) shield has been removed to better show components thereof.

When an optical system is reduced in size, the precision required for the placement of optical elements has to be improved in proportion to the reduction in size. In other words, optical systems can scale in size linearly. For cameras in cellular telephones, the reduction in the size of the imaging system can be dramatic. It is thus a challenge to be able to position and move the optical elements with respect to each other with the required precision.

To be able to accomplish autofocus in a cellular telephone camera, it is common to move a lens or group of lenses. The position and motion of these lenses has to be very precise. Achieving such precision using contemporary technologies is difficult.

One or more embodiments of the present invention provide enhanced precision in the motion of very small camera components by using a micro electromechanical systems (MEMS) stage. This MEMS stage provides for very precise control in the motion of a lens and accomplishes this in a suitably compact form. The MEMS stage serves as an optical bench for precision alignment of the lens with respect to an imaging sensor. According to an embodiment of the present invention, the MEMS stage moves substantially within a plane. That is, the stage tends to remain within the plane defined by the stage itself, rather than moving substantially orthogonally to this plane.

The MEMS stage can be moved by using an electromagnetic actuator. A magnet assembly part of the actuator can be attached to one side, e.g., the bottom, of the stage. A coil of the actuator can be attached to a housing of the camera. The coil and the magnet assembly are aligned to each other via the MEMS stage and the housing. A lens mount that holds the optical element can be attached to the other side, i.e., the top, of the stage. To control the alignment, e.g., tilt, of the lens(es) with respect to an imaging sensor, a number of features are introduced so as to passively align optical components with respect to each other.

Thus, a method and system for providing an autofocus camera are disclosed herein. According to one embodiment of the present invention, the autofocus camera is a miniature camera that is suitable for use in personal electronic devices, such as cellular telephones, pocket PCs, notebook computers, laptop computers, and tablet computers. At least one embodiment of the autofocus camera of the present invention is also suitable for use as a stand alone device. Such a stand alone device can be used for security and surveillance applications, as well as any other desired applications.

The MEMS stage can be used to control the motion of a lens so that the lens moves substantially in only one degree of freedom. The magnet assembly and the lens mount can be attached to the MEMS stage in a planar fashion, so as to better facilitate the use of automated assembly equipment. The housing can be configured so as to both hold the coil of an actuator and align the coil with respect to a magnet assembly. The housing can also be configured so as to align the MEMS stage (and therefore the lens) with respect to the imaging sensor.

Attaching one component to another in a planar fashion as referred to herein can mean placing one component atop another component. Thus, assembling components in a planar fashion can be stacking of the components.

A bias spring can be used to position the stage such that the lens is positioned for focus at one extreme of its travel, e.g., at infinity, when no power is applied to the actuator. Bias spring can be formed of a non-magnetic material so as not to interfere with operation of the actuator. A simple metal clip can be used to hold the bias spring in position against the magnet assembly (which can be attached to the stage).

A metal cover can be used both for electromagnetic interference (EMI) protection and for limiting the motion of the lens mount. The lens mount can have a visor like structure that is configured to abut the metal cover when the stage (and consequently the lens mount) moves too far one direction, e.g., away from the imaging sensor. The visor like structure can be configured so as to abut against the housing when the stage (and consequently the lens mount) moves too far the other direction, e.g., toward the imaging sensor.

The MEMS stage motion can be limited in all degrees of freedom by snubbers so as to protect the flexures from over extending and/or over compressing, such as during a shock. In the travel direction (a direction along an optical axis of the camera in which one or more lenses move to facilitate focusing), the lens mount can abut axial snubbers to limit the motion. In all other degrees of freedom, the silicon stage abuts with six degree of freedom snubbers if the stage's normal limits of motion are exceeded.

These, as well as other features and aspects of various exemplary embodiments of the present invention are discussed below in further detail with respect to the drawings.

Figure 2:
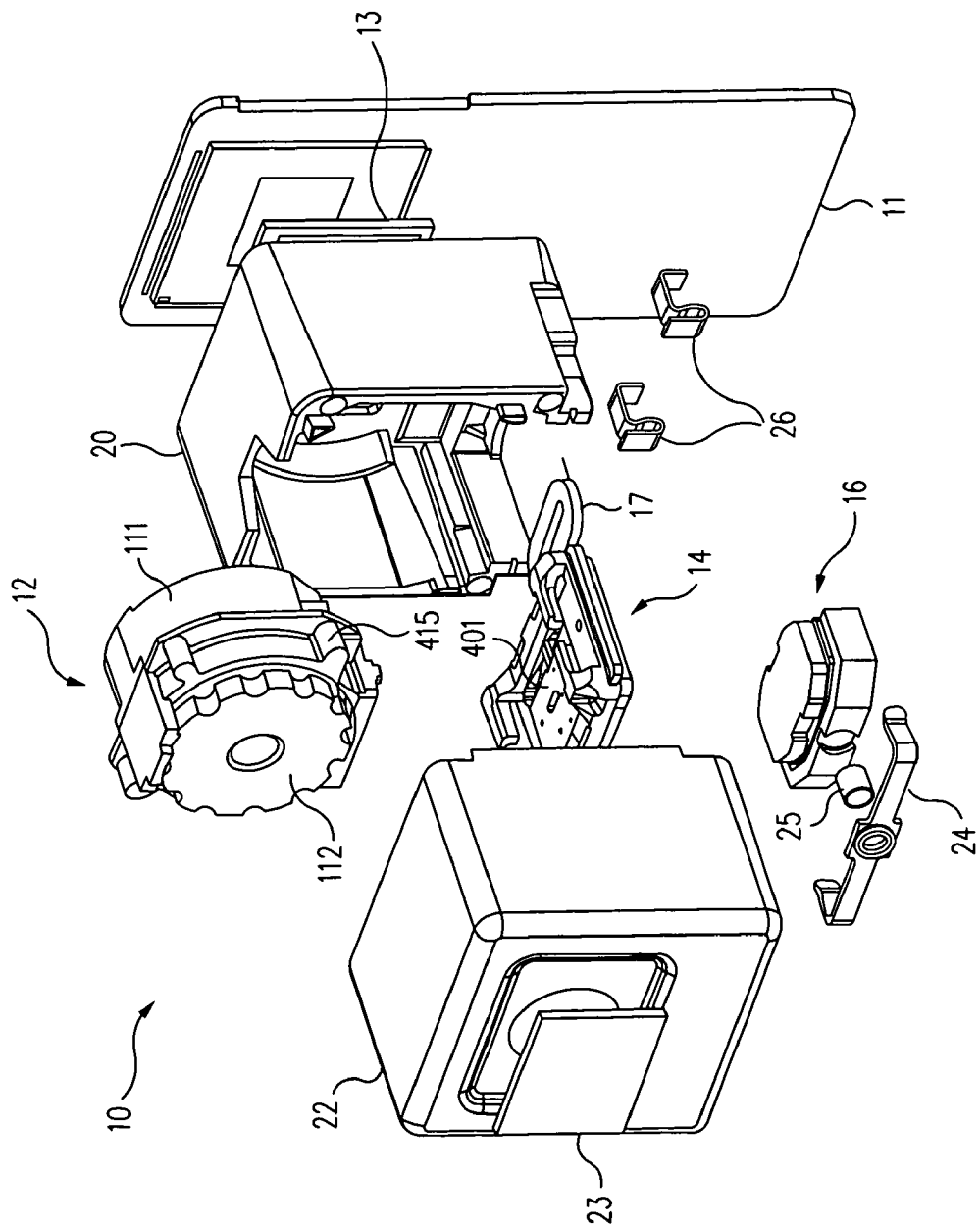
FIG. 2 is an exploded view of the autofocus camera of FIG. 1, including the electromagnetic interference shield thereof.

Referring now to FIGS. 1 and 2, according to one embodiment of the present invention, a miniature autofocus camera can comprise a camera assembly 10 mounted upon a printed circuit board (PCB) 11. Camera assembly 10 can comprise camera optics 12. Camera optics 12 can have at least one movable optical element, such as a lens, so as to facilitate focusing of an image upon an imaging sensor 13.

Imaging sensor 13 can be mounted to printed circuit board 11. Alternatively, imaging sensor 13 can be attached to camera assembly 10. Attachment of imaging sensor 13 to printed circuit board 11 facilitates communication of electrical signals between imaging sensor 13 and other electrical components such as a monitor, memory, and/or a processor. For example, such electrical communication can be facilitated by conductive traces formed upon printed circuit board 11.

As discussed in further detail below, camera optics 12 can be attached to a stage assembly 14 that controls movement of camera optics 12. Movement of camera optics 12 is controlled in a manner that facilitates focusing of the miniature camera while also mitigating misalignment of the optical elements of the miniature camera. Thus, linear movement of camera optics 12 along an optical axis of the camera, e.g., toward and away from imaging sensor 13, is facilitated while movement perpendicular to the optical axis and all rotation of camera optics 12 is inhibited.

More particularly, a stage 401 (better shown in FIGS. 4 and 5) is configured so as to facilitate movement along the direction of the optical axis while not readily facilitating other movement. A six degree of freedom snubber 402 cooperates with axial snubbers 403 to limit movement of stage 401 beyond that for which it is configured. Construction and operation of stage 401, six degree of freedom snubbers 402, and axial snubbers is discussed in further detail below.

A magnet assembly 16 and coil 17 cooperate to define an actuator that effects movement of a stage 401 (and consequently camera optics 12) along the optical axis of the miniature camera to facilitate focusing. The actuator can be a Lorentz actuator. Alternatively, the actuator can be any other desired type of actuator. Advantages associated with the use of the particular Lorentz actuator disclosed herein include small size, reduced weight, low profile, and strong forces generated thereby. Such an actuator is discussed in further detail in U.S. patent application Ser. No. 11/263,149, filed on Oct. 31, 2005 and entitled LORENTZ ACTUATOR FOR MINIATURE CAMERA, the contents of which are hereby expressly incorporated by reference in their entirety.

Magnet assembly 16 can be attached to the underside of stage assembly 14 and coil 17 can be attached to housing 20. Housing 20 generally encloses camera optics 12, stage assembly 14, magnet assembly 16, and coil 17. Housing 20 also facilitates attachment of camera assembly 10 to printed circuit board 11, such as via the use of adhesive bonding. Housing 20 can alternatively be attached to printed circuit board 11 via the use of detents, fasteners, ultrasonic welding, soldering, or via any other desired method.

An electromagnetic interference shield 22 can optionally cover a substantial portion of the miniature autofocus camera of the present invention so as to mitigate the undesirable effects of electromagnetic interference thereupon. As those skilled in the art will appreciate, as miniature cameras get smaller, the effects of electromagnetic interference tend to become more pronounced. As miniature cameras get smaller, the amount of current and voltage used in control and image signals, tends to be reduced. The use of lower signal levels potentially makes these signals more susceptible to interference, such as that caused by electromagnetic radiation emitted by nearby electronic devices, as well as possibly by the personal electronic device within which the miniature camera is installed itself.

A transparent window 23 can be attached to electromagnetic interference shield 22. Electromagnetic interference shield 22 and window 23 can cooperate to inhibit environment contaminants, such as dust, moisture, and smoke, from undesirably contacting optical elements of the miniature camera, such as the lens(es) of camera optics 12 and such as imaging sensor 13. Electromagnetic interference shield 22 can also define a stop that at least partially defines one or more limits on the motion of camera optics 12, as discussed below.

Clip 24 holds bias spring 25 in place. Bias spring 25 biases stage assembly 14 in one direction of its travel, e.g., at a position for focus at infinity. Such biasing provides a known starting position of stage assembly 14 to better facilitate control of movement thereof and provides a desirable failsafe (focus at infinity) therefore. Such a bias spring is discussed in further detail in U.S. patent application Ser. No. 11/219,259, filed on Sep. 2, 2005 and entitled MINIATURE CAMERA BIAS SPRING, the contents of which are hereby expressly incorporated by reference in their entirety.

Contacts 26 facilitate electrical communication between coil 17 and printed circuit board 11. Each of two leads of coil 17 can be in electrical communication with a dedicated contact 26. Each contact 26 can contact a conductive pad of printed circuit board 11. However, those skilled in the art will appreciate that other means for facilitating electrical communication between coil 17 and printed circuit board 11 are likewise suitable.

Figure 3:
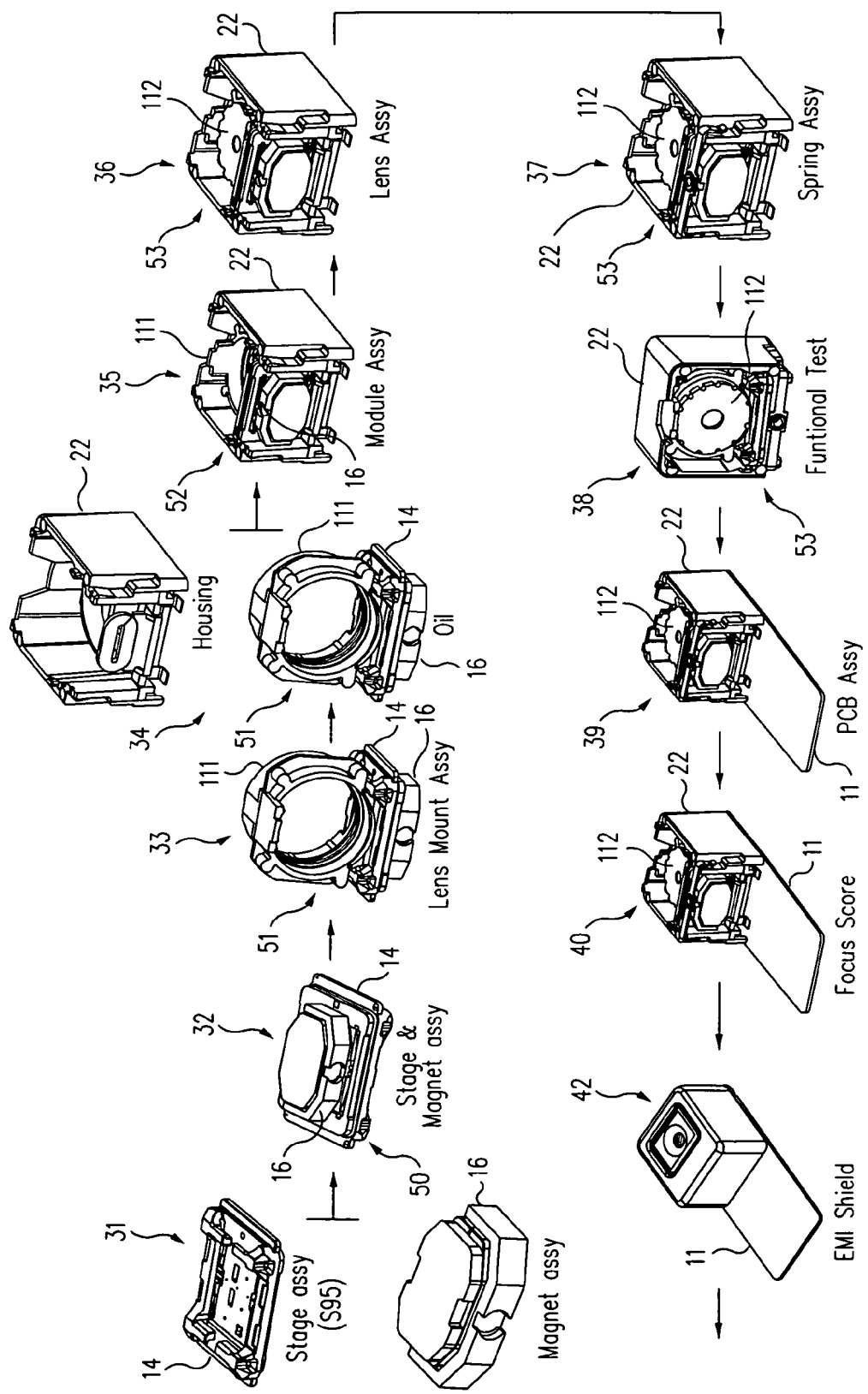
FIG. 3 is a pictorial flow chart showing assembly of the autofocus camera of FIG. 1, according to an exemplary embodiment of the present invention.

Referring now to FIG. 3, a flow chart showing assembly of the autofocus camera of FIG. 1 according to an exemplary embodiment of the present invention is provided. Steps 31-42 are some key aspects of the assembly of the autofocus camera.

According to an embodiment of the present invention, the autofocus camera can be assembled by providing stage assembly 14 and magnet assembly 16 as shown in step 31 and attaching them together, such as via adhesive bonding, to form stage and magnet assembly 50 as shown in step 32. Lens mount 111 can then be attached, such as via adhesive bonding, to the stage and magnet assembly 50 to provide the lens mount assembly 51 shown in step 33.

Lens mount 111, stage assembly 14, and magnet assembly 16 can be assembled to one another in a planar fashion. That is, lens mount 111, stage assembly 14, and magnet assembly 16 can be assembled to one another by successively placing one item atop another. Such assembly facilitates the use of automated assembly equipment such as robots or pick and place equipment. For example, such automated assembly equipment can apply adhesive to magnet assembly 16, place stage assembly 14 upon magnet assembly 16, apply adhesive to stage assembly 14, and place lens mount 111 upon stage assembly 14.

Housing 22 and lens mount assembly 51 of step 34 can be assembled together by inserting lens mount assembly 51 into housing 22 to provide module assembly 52 of step 35. Insertion of lens mount assembly 51 into housing 22 can be performed using automated assembly equipment.

Optionally, oil can be applied to stage assembly 14 to provide damping. The application of oil to stage assembly 14 can be performed prior to insertion of lens mount assembly 51 into housing 22. The oil can be applied between stage 401 (FIG. 5) and six degree of freedom snubber 402. Such damping can enhance operation of the autofocus camera by smoothing the movement of the stage 401. Such damping can also provide enhanced protection against vibration and shock. Such oil damping is discussed in further detail in U.S. patent application Ser. No. 11/219,137, filed on Sep. 1, 2005 and entitled OIL DAMPING FOR CAMERA OPTICAL ASSEMBLY, the contents of which are hereby expressly incorporated by reference in their entirety. In other embodiments, oil may not be added to the MEMS stage.

Lens holder 112 can be attached to lens mount 111 of module assembly 52 to provide lens assembly 53 of step 36. Then, bias spring 25 and clip 24 can be attached to lens assembly 53 as shown in steps 37 and 38.

Functional testing can be performed in step 38 to assure proper operation of the miniature autofocus camera. Functional testing can be performed using test equipment that effects functioning of the autofocus mechanisms such as the actuator defined by magnet assembly 16 and coil 17. Such functional testing can verify proper operation of stage assembly 14, such as the motion control aspects thereof.

Lens assembly 53 can be attached to a printed circuit board 11 at step 39. The focus can be tested to provide a focus score at step 40. Focus testing can be performed using modulation transfer function (MTF). Those units that do not achieve a focus score above a predetermined value can be re-worked and/or rejected. Electromagnetic interference shield 11 can be added at step 42 and then additional testing may be done.

Some aspects of the assembly steps shown in FIG. 3 are discussed in further detail below. Those skilled in the art will appreciate that other sequences of operations can be used to assemble the autofocus camera of one or more embodiments of the present invention.

Figure 4:
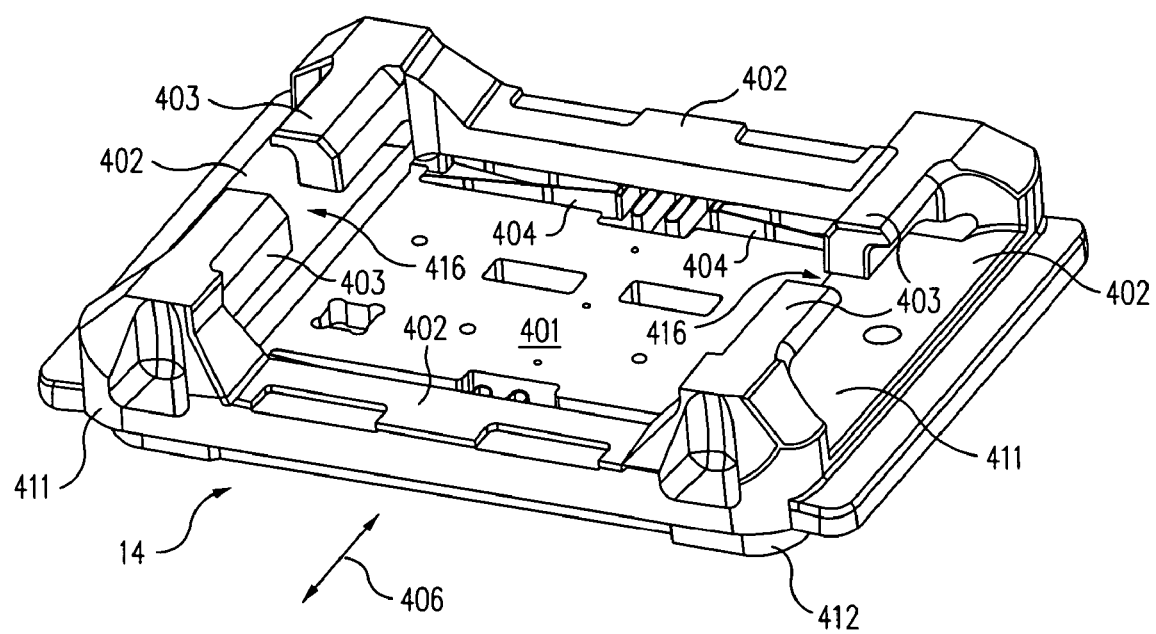
FIG. 4 is an enlarged perspective view of the stage and snubber assembly of FIG. 2.
Figure 5:
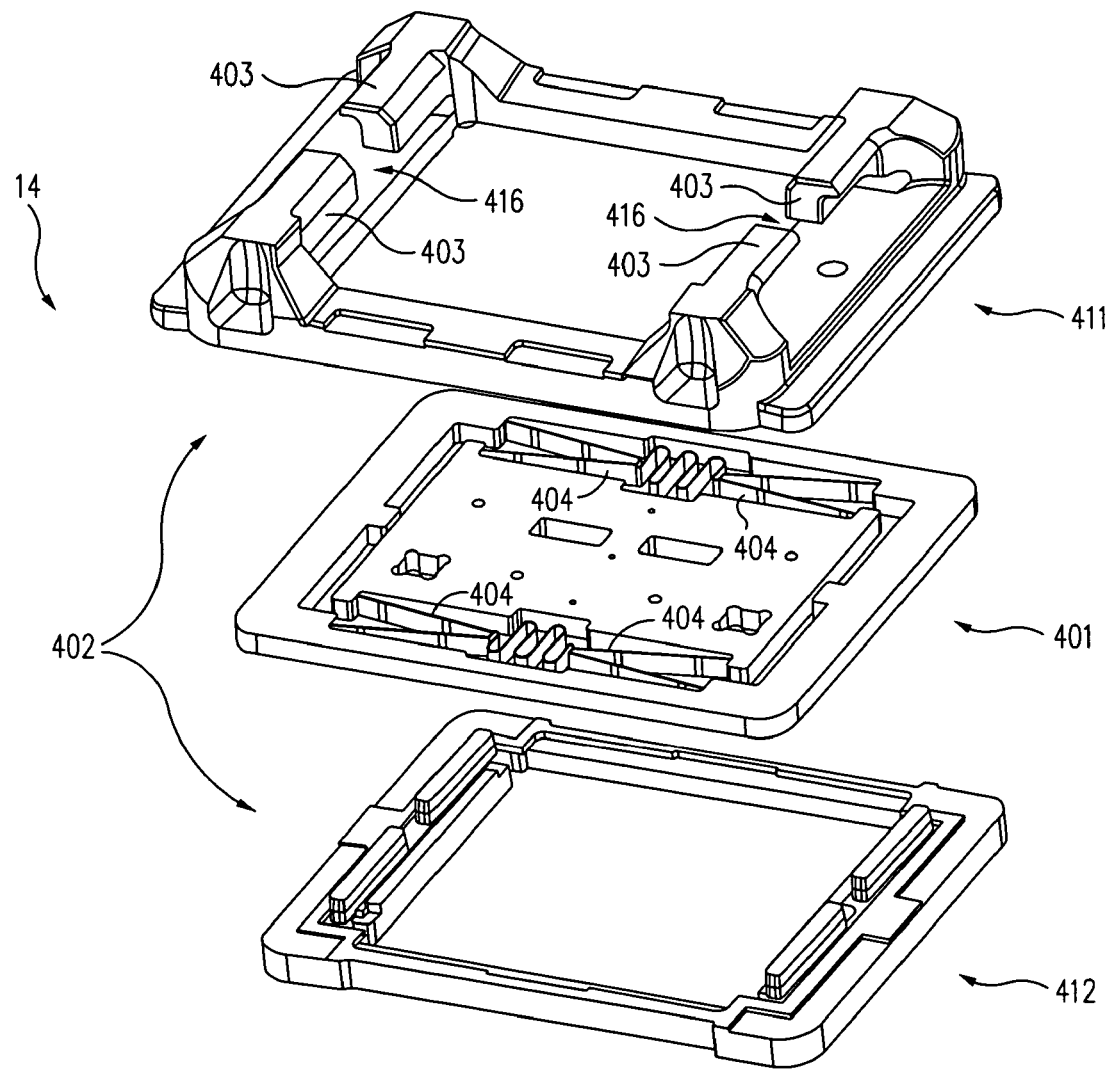
FIG. 5 is an exploded perspective view of the stage and snubber assembly of FIG. 4.

Referring now to FIGS. 4 and 5, a stage assembly 14 comprises a stage 401, a six degree of freedom snubber 402 within which stage 401 is captured, and axial snubbers 403. Six degree of freedom snubber 402 comprises an upper portion 411 and a lower portion 412 that cooperate to sandwich stage 401 therebetween. Six degree of freedom snubber 402 can be formed of a rigid polymer material.

Axial snubbers 403 can be formed integrally with upper portion 411 of six degree of freedom snubber 402. Alternatively, axial snubbers 403 can be formed separately from upper portion 411 of six degree of freedom snubber 402 and then attached thereto.

Stage 401, in cooperation with six degree of freedom snubber 402 and axial snubbers 403, defines the motion of camera optics 12. That is, stage 401 and six degree of freedom snubber 402 allow substantial movement of camera optics 12 along an optical axis of the autofocus camera, e.g., in the directions of double-headed arrow 406, while limiting both translation and rotation about all other axes. A width of stage 401 can be defined as being the shortest of the two longer dimensions thereof, such as the dimension in the direction of arrow 406. A length of stage 401 can be defined as being the longest of the two longer dimensions thereof, such as the dimension perpendicular to the direction of arrow 406. A height of stage 401 can be defined as being the shortest dimension of stage 401 (i.e., from a top or upper surface thereof to a bottom or lower surface thereof as shown in FIG. 4).

Flexures 404 extend from a stationary portion of stage 401 to a moving portion thereof. Flexures 404 facilitate movement of stage 401 along the optical axis while tending to inhibit other movement thereof. Further disclosure regarding such flexures is provided in U.S. Pat. No. 6,850,675 issued on Feb. 1, 2005 and entitled BASE, PAYLOAD AND CONNECTING STRUCTURE AND METHODS OF MAKING THE SAME; U.S. Pat. No. 7,266,272 issued on Sep. 4, 2007 and entitled MOTION CONTROL STAGES AND METHODS OF MAKING THE SAME; and U.S. Pat. No. 7,113,688 issued on Sep. 26, 2006 and entitled BASE, PAYLOAD AND CONNECTING STRUCTURE AND METHODS OF MAKING THE SAME. The respective disclosures of these patents are all hereby expressly incorporated by reference in their entirety.

Six degree of freedom snubber 402 prevents stage 401 from moving substantially beyond the range of motion permitted by flexures 404. In this manner, six degree of freedom snubber mitigates the likelihood of incurring, damage to flexures 404, stage 401 and/or other camera components due to excessive motion of stage 401, such as due to excessive translation and/or rotation thereof. Such a six degree of freedom snubber is discussed in further detail in U.S. patent application Ser. No. 11/268,849, filed on Nov. 8, 2005, now U.S. Pat. No. 7,646,969, issued Jan. 12, 2010 and entitled CAMERA SNUBBER ASSEMBLY, the contents of which are hereby expressly incorporated by reference in their entirety.

Figure 11:
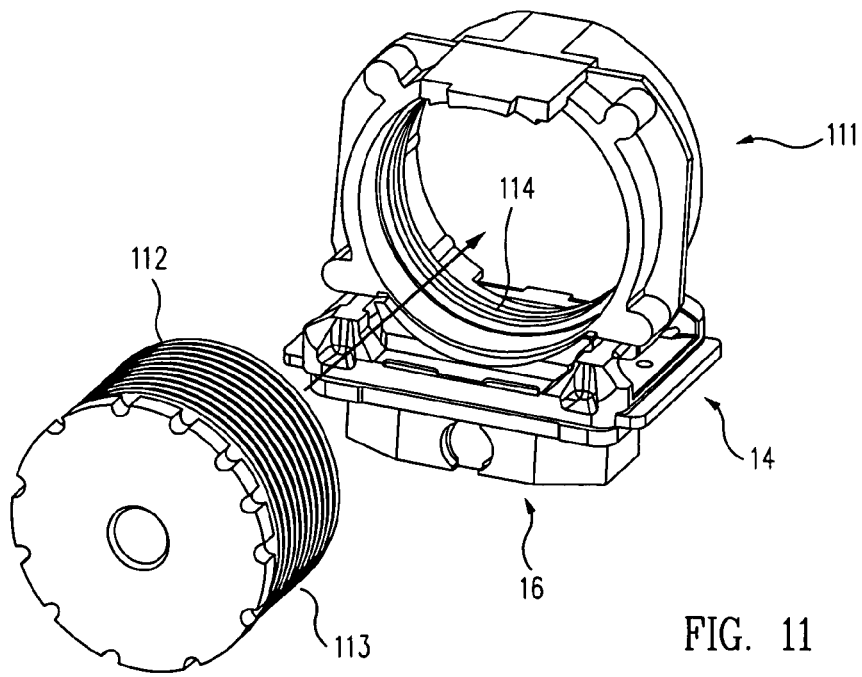
FIG. 11 is a perspective view of the magnet assembly of FIG. 8 attached to the bottom of the stage and snubber assembly of FIG. 4 and the lens mount of FIG. 2 attached to the top thereof.

Axial snubbers 403 limit movement of camera optics 12 (FIG. 2) along the direction of double-headed arrow 406. Axial snubbers 403 thus also limit movement of stage 401 within six degree of freedom snubber 402. Axial snubbers 403 limit movement of lens mount 111 (and consequently of lens holder 112, stage 401, and magnet assembly 16 as well) by abutting stop 415 of lens mount 111 that is disposed in gap defined by adjacent axial snubber 403, as best seen in FIG. 11. Thus, as lens mount 111 moves along the optical axis defined by double-headed arrow 406, stops 415 contacts axial snubber 403 when it travels to each extreme of its movement.

Axial snubbers can be formed of a polymer material, such as silicon rubber, to cushion such contact. It should be noted that the camera can be configured such that contact of stops 415 with axial snubbers does not occur during normal operation. Such limiting of the movement at camera optics 12 and stage 401 can mitigate the likelihood of damage to camera optics 12, stage 401, flexures 404, six degree of freedom snubber 402 and other miniature camera components during abnormal events, such as shock. Such axial snubbers 403 are discussed in further detail in U.S. patent application Ser. No. 11/269,304, filed on Nov. 8, 2005, now U.S. Pat. No. 7,555,210, issued Jun. 30, 2009 and entitled AXIAL SNUBBERS FOR CAMERA, the contents of which are hereby expressly incorporated by reference in their entirety.

Stage 401 can be formed of silicon using micro electromechanical systems (MEMS) techniques. For example, stage 401 can be formed by etching or micromachining silicon. The fixed portion of stage 401, the moving portion of stage 401, and flexures 404 can be formed from a single, monolithic piece of material, such as silicon. Micromachining can include ion milling, laser ablation, chemical mechanical polishing (CMP), micro-electrical discharge, micro forging, etc.

Stage 401 also provides a way to connect the actuator defined by magnet assembly 16 and coil 17 to optics assembly 12, so as to effect movement of optics assembly 12 in order to facilitate focusing of the miniature camera. More particularly, stage 401 facilitates attachment of magnet assembly 16 to camera optics 12 such that movement of magnet assembly 16 in response to current flow through coil 17 results in like movement of camera optics 12.

Figure 6:
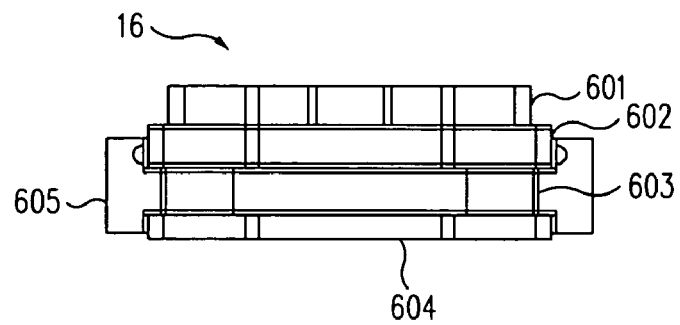
FIG. 6 is an enlarged side view of the magnet assembly of FIG. 2.
Figure 7:
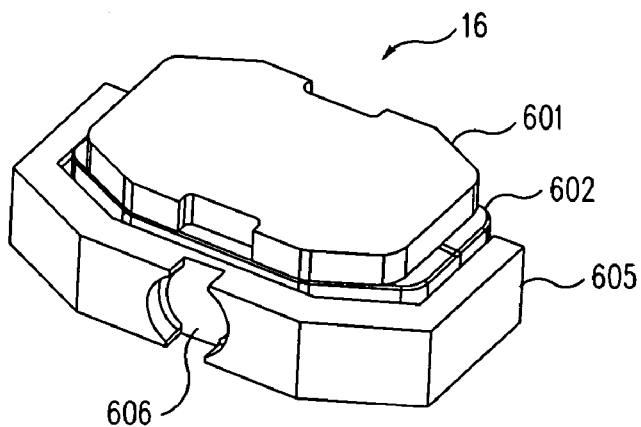
FIG. 7 is a perspective top view of the magnet assembly of FIG. 6.
Figure 8:
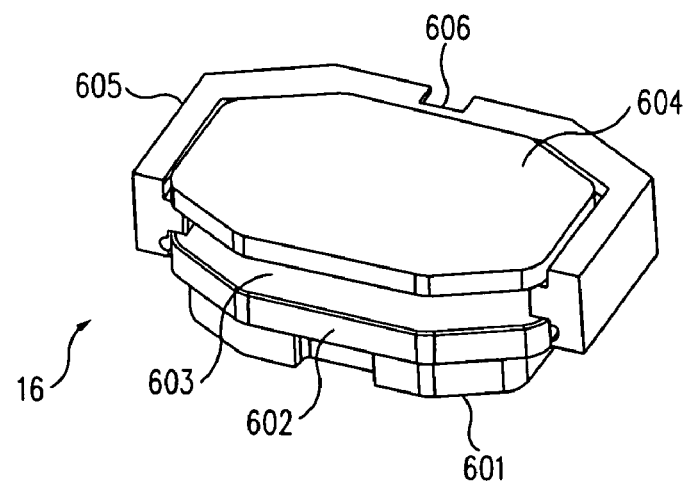
FIG. 8 is a perspective bottom view of the magnet assembly of FIG. 6.

Referring now to FIGS. 6-8, according to an exemplary embodiment of the present invention, a magnet assembly space 16 comprises a first magnet 601, a first flux guide 602, a second magnet 603, and a second flux guide 604 assembled together into a stack. A non-magnetic, e.g., plastic holder 605, helps to maintain the desired positions of magnets 601 and 603 and flux guides 602 and 602. Magnets 601 and 603, flux guides 602 and 604, and holder 605 can be adhesively bonded to one another. Alternatively, magnets 601 and 603, flux guides 602 and 604, and holder 605 can be attached to one another via the use of detents, fasteners, or by any other desired method.

A seat 606 can be formed in holder 605 to receive one end of spring 25. As discussed above, spring 25 biases magnet assembly 16, and thus camera optics 12 as well, to one extreme of travel.

Figure 9:
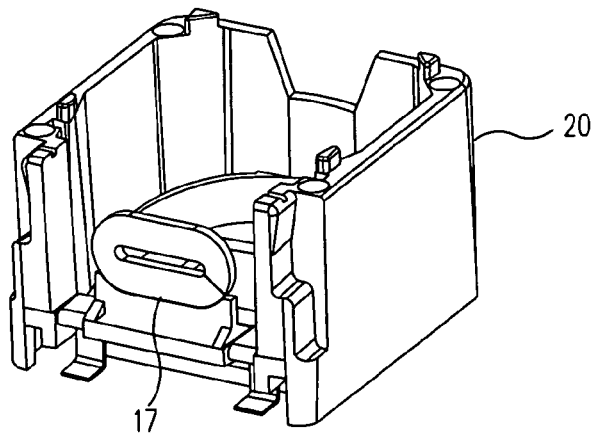
FIG. 9 is a perspective view of the housing of FIG. 2, including the actuator coil.

Referring now to FIG. 9, coil 17 can be attached to housing 20 by adhesive bonding. Coil 17 can alternatively be attached to housing 20 by detents, fasteners, or by any other desired method. Coil 20 is thus fixedly attached to housing 20 and remains substantially stationary with respect thereto during operation of the actuator so as to effect movement of camera optics 12 in order to provide focusing.

Figure 10:
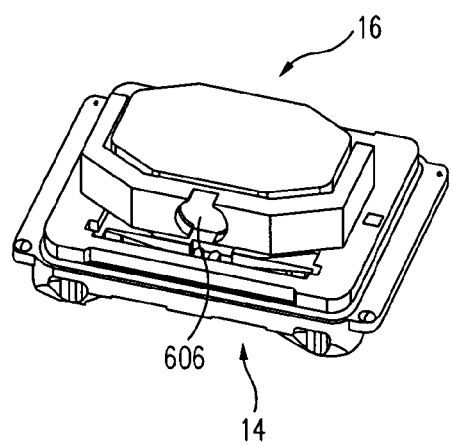
FIG. 10 is a is a perspective view of the magnet assembly of FIG. 8 attached to the bottom of the stage and snubber assembly of FIG. 4.

Referring now to FIG. 10, magnet assembly 16 is attached to the underside of stage assembly 14. More particularly, magnet assembly 16 is attached to the underside of stage 401. Magnet assembly 16 can be attached to stage 401 by adhesive bonding. Alternatively, magnet assembly 16 can be attached to stage 401 by detents, fasteners, or by any other desired method.

Thus, magnet assembly 16 is fixedly attached to stage 401 such that movement of magnet assembly 16 effects similar movement of stage 401. In this manner, camera optics 12, which are attached to stage 401, are also moved so as to effect focusing.

Referring now to FIG. 11, lens holder 112 can be screwed into lens mount 111 to form camera optics 12 via threads 113 formed upon lens holder 112 and threads 114 formed within lens mount 111. The use of threads to attach lens holder 112 to lens mount 111 facilitates adjustment of the optical elements, e.g., lenses, of lens holder 112 with respect to lens mount 111, so as to tend to position such optical elements for optimum operation, e.g., focus is optimal at infinity. However, lens holder 112 can be attached to lens mount 111 by detents, fasteners, adhesive bonding, or by any other desired method. Lens holder 112 can be attached to lens mount 111 either before or after lens mount 111, stage assembly 14, and magnet assembly 16 are inserted into housing 20 (as shown in FIG. 12).

As shown in FIG. 11, lens mount 111 is attached to the upper surface of stage 401 and magnet assembly 16 is attached to the underside or lower surface thereof. Thus, movement of magnet assembly 11 results in like movement of the optical elements of lens holder 112 so as to effect focusing.

Figure 12:
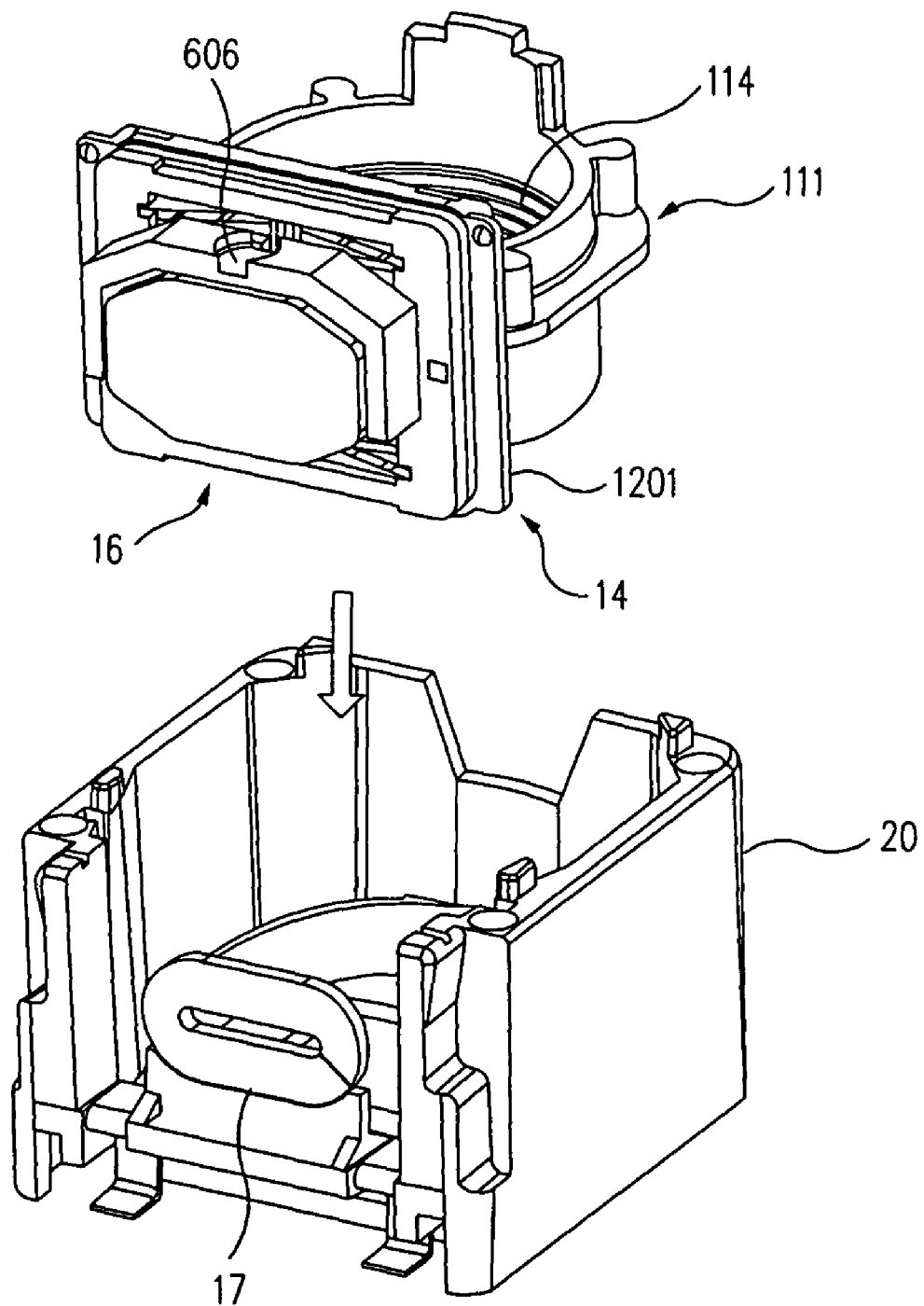
FIG. 12 is a perspective view of the lens mount, magnet assembly, and the stage and snubber assembly (attached to one another) as they are being inserted into the housing of FIG. 2.

Referring now to FIG. 12, lens mount 111, stage assembly 14, and magnet assembly 16 can be inserted into housing 20. Housing 20 can be configured such that a portion of stage assembly 20, such as stationary portion 1201 thereof, attaches to housing 20. Stationary portion 1201 can be attached to housing 20 by adhesive bonding. Alternatively, any other non-moving portion of stage assembly 14 can be attached to housing 20 via detents, fasteners, or by any other desired method. Since a non-moving portion of stage assembly 14 is attached to housing 20, stage 401, magnet assembly 16, and lens mount 111 (which contains lens holder 112) are free to move along an optical axis of the miniature camera (as indicated by double-headed arrow 406 of FIG. 4).

Figure 13:
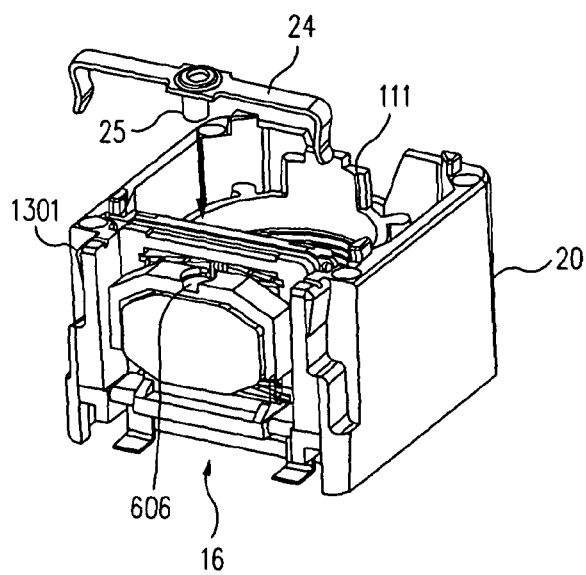
FIG. 13 is a perspective view of the lens mount, magnet assembly, and the stage and snubber assembly after they have been inserted into the housing of FIG. 2, and showing the clip of FIG. 2 as it is being attached to the housing so as to maintain the bias spring therein.
Figure 14:
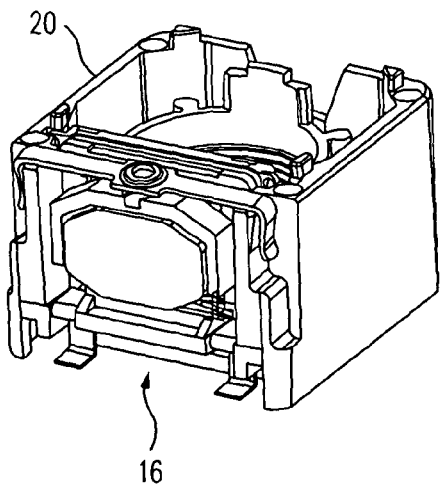
FIG. 14 is a perspective view of the lens mount, magnet assembly, and the stage and snubber assembly after they have been inserted into the housing of FIG. 13, and showing the clip after it has been attached to the housing.

Referring now to FIGS. 13 and 14, clip 24 can be attached to housing 20 to hold bias spring 25 against seat 606 of magnet assembly 16. Clip 24 can snap over detents 1301 of housing 20 to effect such attachment. Alternatively, clip 24 can be attached to housing 20 via adhesive bonding, fasteners, or by any other desired method.

Figure 15:
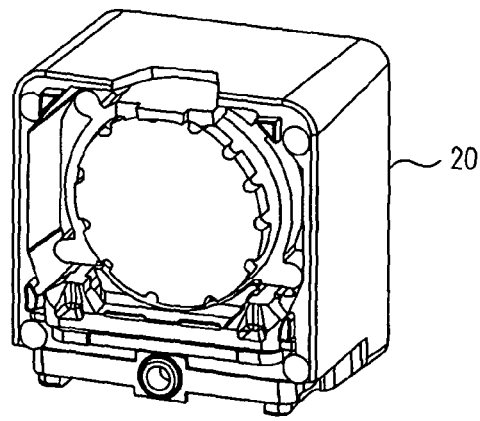
FIG. 15 is a perspective view of the partially assembled autofocus camera of FIG. 14 after the lens assembly of FIG. 2 has been screwed into the lens mount thereof.

Referring now to FIG. 15, lens holder 112 can be attached to lens mount 111 after lens mount 111 (along with stage assembly 14 and magnet assembly 16) have been placed into housing 20, if desired. Alternatively, lens holder 112 can be attached to lens mount 11 before lens mount 11 has been placed into housing 20.

Figure 16:
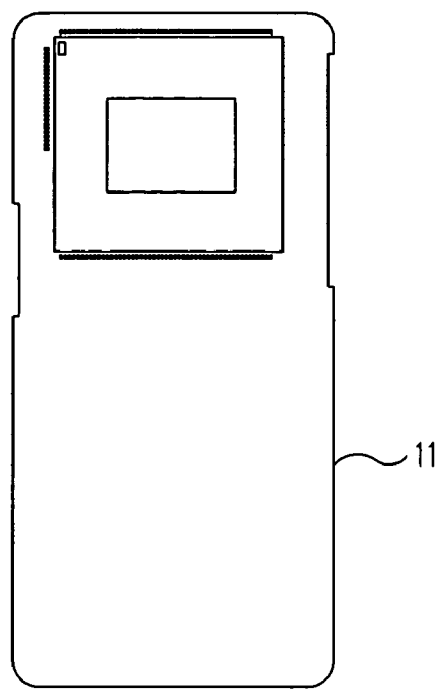
FIG. 16 is an enlarged front view of the printed circuit board of FIG. 2.

Referring now to FIG. 16, printed circuit board 11 is configured to facilitate attachment of imaging sensor 13 (FIG. 2) and housing 20 thereto. Printed circuit board 11 can also be configured for the attachment of camera electronics thereto. Such camera electronics can include a processor and/or controller that facilitates, possibly among other things, control of the autofocus actuator defined by coil 17 and magnet assembly 16, as well as facilitates control and readout of imaging sensor 13.

Figure 17:
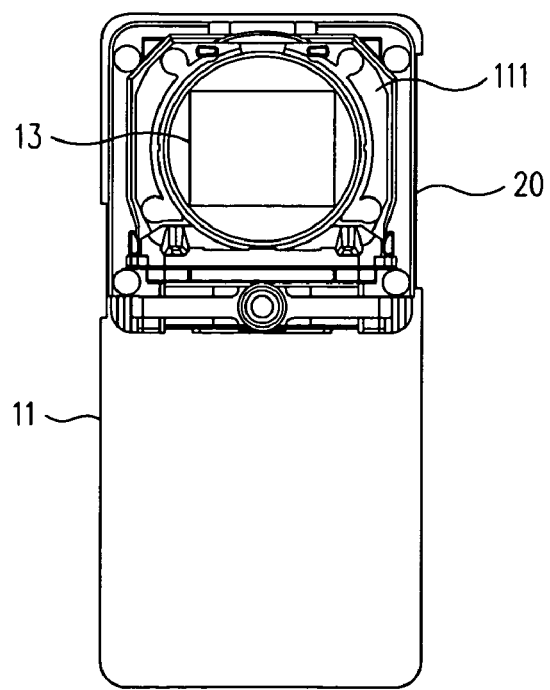
FIG. 17 is a front view of the printed circuit board of FIG. 16 having the partially assembled autofocus camera of FIG. 14 attached thereto, wherein the lens assembly is removed to show the imaging sensor attached to the printed circuit board.

Referring now to FIG. 17, housing 20 is shown attached to printed circuit board 20. Imaging sensor 13 is also attached to printed circuit board 11. Lens holder 112 is shown removed from lens mount 111, so that imaging sensor 13 can be seen.

Figure 18:
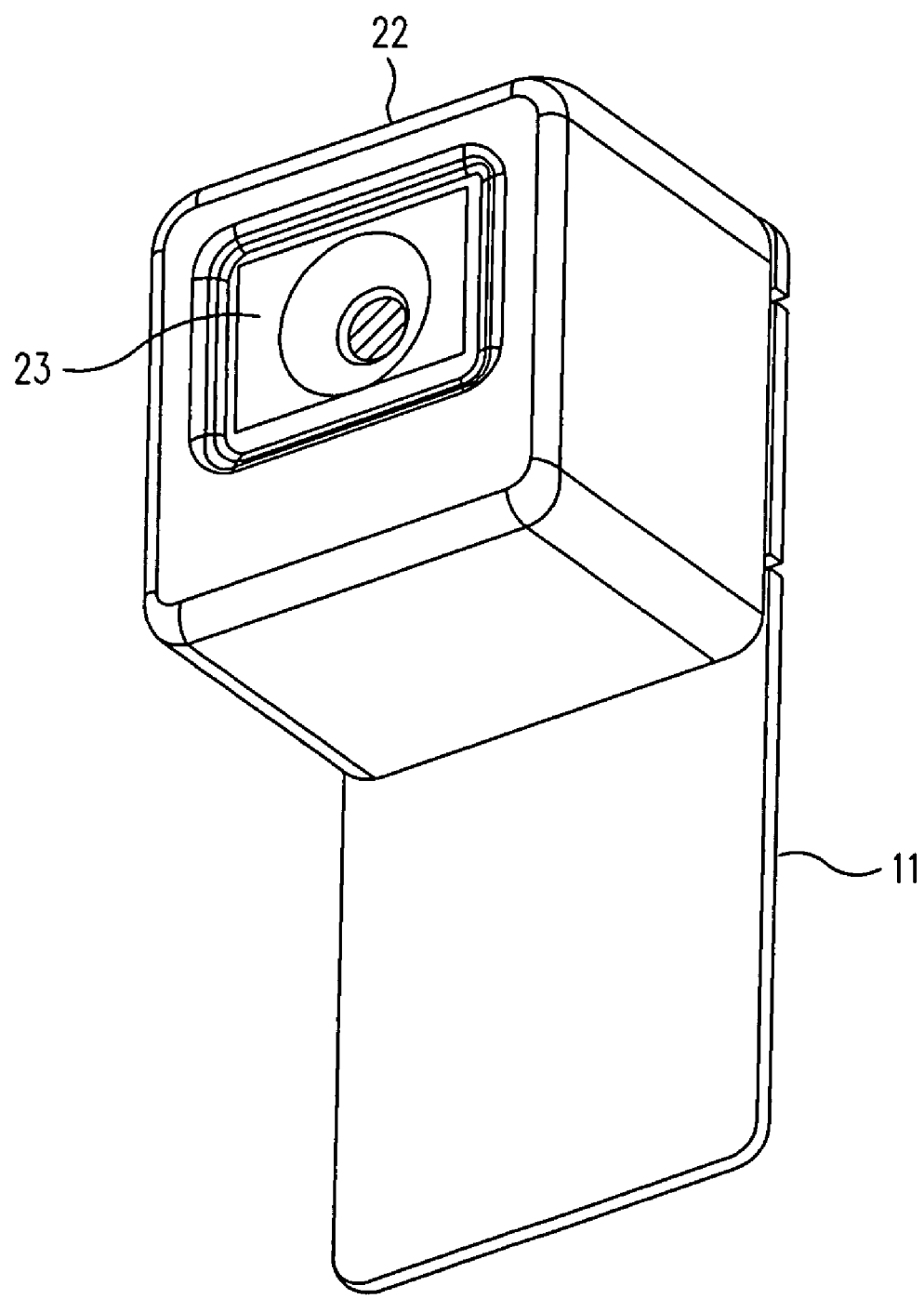
FIG. 18 is a perspective view of the assembled autofocus camera of FIG. 2.

Referring now to FIG. 18, electromagnetic interference shield 22 is shown covering housing 20. Electromagnetic interference shield 22 can be attached to housing 20 and/or printed circuit board 11 by adhesive bonding. Alternatively, electromagnetic interference shield 22 can be removably attached to housing 20 and/or printed circuit board 11 via detents, fasteners, or any other desired method.

In operation, current flows through coil 17 such that a Lorentz force generated by the cooperation of coil 17 with magnet assembly 16 causes stage 401 to move. Current flow through coil 17 can be controlled by a processor, such as a dedicated processor mounted on printed circuit board 11, to provide autofocus. The processor can alternatively be a processor of a personal electronic device, such as a processor of a cellular telephone. Stage 401 can be moved so as to position camera optics 12 in a manner that effects autofocus according to well known principles. Alternatively, movement of stage 401 can be controlled manually, such as via a switch of the personal electronics device, so as to allow a user to focus the camera.

In view of the foregoing, one or more embodiments of the present invention provide a miniature autofocus camera that is suitable for use in personal electronic devices, such as cellular telephones. Focusing of the camera tends to provide better images, particularly in low light situations where a larger aperture is necessary to provide adequate light or where a higher resolution picture is desirable. The need to use a flash is mitigated by facilitating the use of larger apertures. Since less use of a flash is facilitated, the batteries of the personal electronic device tend to have longer lives.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A stage for a miniature camera, the stage comprising:
   a generally planar moving portion that is configured to move generally within the plane of the moving portion;
   a generally planar stationary portion surrounding the moving portion;
   a flexure coupling the moving portion to the stationary portion; and,
   a snubber assembly surrounding the moving portion, the stationary portion and the flexure and operable to constrain the moving portion to move substantially in only one degree of freedom with respect to the stationary portion.

2. The stage as recited in claim 1, wherein the moving portion, the stationary portion and the flexure are formed by a MEMS process.

3. The stage as recited in claim 1, wherein the moving portion is also constrained by the flexure to move substantially in the only one degree of freedom with respect to the stationary portion.

4. The stage as recited in claim 1, wherein the stage is formed monolithically of a single piece of silicon.

5. The stage as recited in claim 1, wherein the stage is formed by etching.

6. The stage as recited in claim 1, wherein the stage is formed by micromachining.

7. The stage as recited in claim 1, wherein the stage is configured to facilitate attachment of camera optics thereto.

8. The stage as recited in claim 1, wherein the stage is configured to facilitate attachment of an actuator thereto.

9. A stage assembly for a miniature camera, the stage assembly comprising:
   a generally planar stage;
   at least one magnet of an actuator attached to the stage for effecting movement of the stage in the plane of the stage;
   at least one lens attached to the stage, movement of the lens effecting focusing of the camera;
   a housing within which the stage, the magnet and the lens are at least partially disposed;
   a bias spring for biasing the stage at one extreme of its motion; and,
   a clip configured to attach to the housing for holding the bias spring in place with respect thereto.

10. The stage assembly as recited in claim 9, wherein the stage comprises a stationary portion and a moving portion and the stationary portion is attached to a snubber assembly that substantially limits motion of the moving portion to a single degree of freedom.

11. The stage assembly as recited in claim 9, wherein the bias spring biases the stage for focus at infinity.

\* \* \* \* \*